US012578428B2

(12) United States Patent
Doerr et al.

(10) Patent No.: US 12,578,428 B2
(45) Date of Patent: Mar. 17, 2026

(54) METHOD FOR ESTIMATING A MOUNTING POSITION OF A RADAR SENSOR

(71) Applicant: Aptiv Technologies AG, Schaffhausen (CH)

(72) Inventors: Wolfgang Doerr, Wiehl (DE); Jens Westerhoff, Bochum (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 433 days.

(21) Appl. No.: 18/328,569

(22) Filed: Jun. 2, 2023

(65) Prior Publication Data

US 2023/0408646 A1     Dec. 21, 2023

(30) Foreign Application Priority Data

Jun. 15, 2022    (EP) ..................................... 22179207

(51) Int. Cl.
| | |
|---|---|
| *G01S 7/40* | (2006.01) |
| *G01S 7/41* | (2006.01) |
| *G01S 13/931* | (2020.01) |

(52) U.S. Cl.
CPC .............. G01S 7/4026 (2013.01); G01S 7/41 (2013.01); G01S 13/931 (2013.01)

(58) Field of Classification Search
CPC . C12Q 1/6886; C12Q 2600/154; G01S 13/42; G01S 13/931; G01S 7/4004; G01S 7/4021; G01S 7/4026; G01S 7/41
See application file for complete search history.

(56) References Cited

U.S. PATENT DOCUMENTS

| | | | | |
|---|---|---|---|---|
| 5,964,822 | A | 10/1999 | Alland et al. | |
| 6,202,027 | B1 | 3/2001 | Alland et al. | |
| 6,556,166 | B1 * | 4/2003 | Searcy .................. | G01S 7/4026 |
| | | | | 343/703 |
| 6,900,755 | B2 | 5/2005 | Richardson et al. | |
| 8,441,394 | B2 * | 5/2013 | Alland .................. | G01S 13/931 |
| | | | | 340/436 |
| 9,500,742 | B2 * | 11/2016 | Poiger ..................... | G01S 13/42 |

(Continued)

FOREIGN PATENT DOCUMENTS

| | | |
|---|---|---|
| CN | 114556143 | 5/2022 |

OTHER PUBLICATIONS

"Extended European Search Report", EP Application No. 22179207.0, Nov. 4, 2022, 9 pages.

(Continued)

*Primary Examiner* — Peter M Bythrow
(74) *Attorney, Agent, or Firm* — Harness, Dickey & Pierce, P.L.C.

(57) ABSTRACT

A method is provided for determining a mounting position of a radar sensor at a vehicle. The mounting position is defined with respect to a ground plane on which the vehicle is currently located. Radar responses captured by the radar sensor are received, wherein a field of view of the radar sensor covers at least a predefined area of the ground plane. A sequence of characteristics of the radar responses is determined, and the mounting position is determined by performing the operations of optimizing parameters of a predefined model with respect to the sequence of characteristics of the radar responses, and determining the mounting position based on the optimized parameters of the predefined model.

17 Claims, 7 Drawing Sheets

500

(56) References Cited

U.S. PATENT DOCUMENTS

| | | | |
|---|---|---|---|
| 10,024,955 B2 * | 7/2018 | Song | G01S 7/4972 |
| 10,585,170 B2 * | 3/2020 | Hellinger | G01S 7/4026 |
| 2012/0235851 A1 * | 9/2012 | Park | G01S 7/4052 |
| | | | 342/70 |
| 2015/0314785 A1 * | 11/2015 | Kwon | B60W 50/0225 |
| | | | 701/1 |
| 2017/0248688 A1 * | 8/2017 | Campbell | G01S 7/4026 |
| 2017/0363718 A1 * | 12/2017 | Ishimori | G01S 7/40 |
| 2019/0162820 A1 * | 5/2019 | Agarwal | G01S 7/497 |
| 2020/0003868 A1 | 1/2020 | Yan et al. | |
| 2020/0094677 A1 * | 3/2020 | Hao | G01S 17/931 |
| 2020/0158861 A1 * | 5/2020 | Cattle | G01S 13/9029 |
| 2021/0278511 A1 * | 9/2021 | Krishnan | G01S 7/4026 |
| 2021/0341599 A1 * | 11/2021 | Rozewicz | G01S 13/931 |
| 2022/0228862 A1 * | 7/2022 | Kondo | G01B 11/0608 |
| 2022/0229168 A1 * | 7/2022 | Kondo | G01S 13/42 |
| 2023/0384419 A1 * | 11/2023 | Blaes | G01S 13/87 |

OTHER PUBLICATIONS

Bao, et al., "Motion Based Online Calibration for 4D Imaging Radar in Autonomous Driving Applications", Mar. 2020, pp. 108-111.

* cited by examiner

<u>500</u>

700

METHOD FOR ESTIMATING A MOUNTING POSITION OF A RADAR SENSOR

INCORPORATION BY REFERENCE

This application claims priority to European Patent Application No. EP22179207.0, filed Jun. 15, 2022, the disclosure of which is incorporated by reference in its entirety.

BACKGROUND

Modern vehicles, for example vehicles equipped with an advanced driver assistance system (ADAS) or autonomous vehicles, often use at least one radar sensor to perceive the environment of the vehicle. Via the radar sensor, a range or distance and a height of a potentially hazardous object may be determined.

For determining the height of an object under consideration, an elevation angle is usually estimated for the object with respect to the radar sensor, e.g., in a radar coordinate system. In order to determine the required object height relative to a ground plane on which the vehicle is currently located, a spatial transformation between the radar coordinate system and a ground coordinate system is required.

In order to perform this spatial transformation properly, an accurate knowledge of the mounting position is required for the radar sensor with respect to the vehicle. The mounting position at least includes a height of the radar sensor over ground (e.g., with respect to the ground plane) and a mounting angle of the radar sensor with respect to the ground plane.

A common concept for estimating the mounting position of a radar sensor within a vehicle is a factory or garage alignment. According to this concept, the mounting position is initially estimated in the factory during manufacturing the vehicle. A special equipment is required which includes dedicated targets and/or mechanical adjustment systems providing a high precision, wherein this special equipment is applied to the radar sensor by trained experts. During the life time of the vehicle, however, the mounting position of the radar sensor has to be realigned at a garage, e.g., after damages or accidents of the vehicle. The factory and garage alignments of the radar sensor increase the cost which is required for the operation of the radar system.

Alternatively or additionally, an online calibration may be performed, e.g., during the life time of the vehicle. For the online calibration, so-called targets of opportunity are used which have to be available in the external environment of the vehicle.

In summary, the common concepts for estimating the mounting position of the radar sensor require a special equipment, trained experts and/or the availability of special targets. Therefore, the common concepts for estimating the mounting position of the radar sensor entail additional cost for the entire radar system of the vehicle.

Accordingly, there is a need to provide a method for determining the mounting position of a radar sensor without the requirement of a factory calibration and/or the presence of special targets.

SUMMARY

The present disclosure provides computer implemented methods, computer systems, and non-transitory computer readable mediums, including those described in the claims. Embodiments are given in the claims, the description, and the drawings.

In one aspect, the present disclosure is directed at a computer implemented method for determining a mounting position of a radar sensor at a vehicle. The mounting position is defined with respect to a ground plane on which the vehicle is currently located. According to the method, radar responses captured by the radar sensor are received by a processing unit, wherein a field of view of the radar sensor covers at least a predefined area of the ground plane. Via the processing unit, a sequence of characteristics of the radar responses is determined, and the mounting position is determined by performing the operations of: optimizing parameters of a predefined model with respect to the sequence of characteristics of the radar responses, and determining the mounting position based on the optimized parameters of the predefined model.

The radar sensor may include a transmitting part for transmitting waves and a receiving part for receiving waves. The transmitting part may include one or more transmitter elements, whereas the receiving part may include one or more receiver elements. The transmitter elements may be transmitting antenna elements which transmit radar waves to an object in the external environment of the vehicle. The receiver elements may be receiving antenna elements receiving the radar waves which are transmitted by the transmitter elements and which are reflected at the object in the external environment of the vehicle. The term "radar response" may therefore refer to the radar waves which are received by the receiving antenna elements of the radar sensor and which are processed (e.g., by a transceiver block of the radar sensor, which also may control the transmission of waves by the transmitting antenna elements).

The processing unit may receive the radar responses captured by the radar sensor in the form of signals of measurement information provided by the transceiver block of the radar sensor. From this measurement information or these signals received from the transceiver block, the processing unit may derive amplitude and phase information in order to determine the sequence of characteristics of the radar responses.

The term "characteristics" may include respective maxima of an entity comprised by the radar responses, e.g., maxima of power, energy and/or amplitudes associated with the radar responses. A maximum or peak finding procedure may be applied to one of these entities in order to provide the sequence of characteristics.

The predefined model includes a set of parameters in order to adapt the model to the sequence of characteristics, e.g., via a linear least-squares estimation. For example, if the predefined model includes a linear function, the parameters may include an offset and a slope of the linear function.

The mounting position may include a mounting height and/or a mounting angle of the radar sensor with respect to the ground plane. Both of the mounting height and the mounting angle may be estimated by performing the method. Alternatively, either the mounting height or the mounting angle may be predefined, whereas the respective other of the mounting height and the mounting angle may be estimated by the method. Optionally, the mounting position may further include a roll angle of the radar sensor with respect to the ground plane which may also be estimated by performing the method.

By the method according to the disclosure, the mounting position of the radar sensor, e.g., the mounting height and the mounting angle, can be estimated solely from the radar responses originating from the ground plane or road surface on which the vehicle is currently located. Therefore, no factory or garage alignment or calibration is required for determining the mounting position of the radar sensor. Moreover, no special targets or targets of opportunity are needed since the ground plane or road surface is always available. Hence, the method is very robust and has a high availability.

Moreover, the method according to the disclosure allows an adaptation of the originally or previously estimated mounting position of the radar sensor during the life time of the vehicle. For example, the mounting position of the radar sensor may be corrected after an accident and/or a repair of the vehicle. In addition, the mounting position of the radar sensor may also be corrected in order to be adapted to load changes of the vehicle, e.g., if the number of occupants in the vehicle changes, which may affect the mounting position of the radar sensor relative to the ground plane. Therefore, the method according to the disclosure provides high flexibility for determining a revised mounting position while requiring a low effort. In summary, the accuracy and the reliability of the resulting mounting position may be improved in comparison to known estimation methods.

According to an embodiment, the characteristics of the radar responses may depend on a range and on a height with respect to the radar sensor. The range and the height may provide a minimum set of data in order to determine the mounting position. If the characteristics are represented as a function of the range and the height, the method may require a low computational effort.

The predefined model may include a parametric model function representing a height profile of a road on which the vehicle is currently located. The height profile may include the parameters which are to be optimized by adapting the height profile to the sequence of characteristics.

For example, the parametric model function may be a linear function. Accordingly, a mounting height of the mounting position may be determined via an offset of the linear function, whereas a mounting angle of the mounting position may be determined via a slope of the linear function. If the linear function is adapted to the characteristics, e.g., to amplitudes, of the radar responses, a low effort may be required for the adapting or fitting procedure which may be based on a linear least-squares estimation.

According to a further embodiment, the sequence of characteristics of the radar responses may be determined depending from coordinates relative to the ground plane and a height with respect to the radar sensor. The mounting position may include a mounting height, a mounting angle and a roll angle of the radar sensor with respect to the ground plane. For this embodiment, the predefined model may depend on the coordinates relative to the ground plane and on the height with respect to the radar sensor. The mounting height, the mounting angle and the roll angle may be determined by adapting the predefined model to the sequence of characteristics.

The coordinates within the ground plane may include cartesian coordinates or, alternatively, a range and an azimuth angle with respect to the vehicle. Hence, an additional dimension is used for adapting the predetermined function to the amplitudes which allows to estimate the rotation of the radar sensor with respect to the ground plane. The additional information regarding the roll angle or rotation of the radar sensor may improve the reliability and the accuracy of the measurements performed by the radar sensor, e.g., when determining the height of an external object.

According to another embodiment, the sequence of characteristics of the radar responses may be determined for a predetermined time period. Therefore, the radar responses and their amplitudes are accumulated over the predetermined time period. Alternatively or additionally, the sequence of characteristics of the radar responses may be determined for a predetermined motion sequence of the vehicle. Hence, the radar responses and e.g., their amplitudes may be accumulated over the vehicle movement for this embodiment. For example, this accumulation may be performed between two stops of the vehicle. By accumulating the radar responses over the predetermined time period and/or over the vehicle movement, the accuracy and the reliability may be enhanced for determining the mounting position of the radar sensor.

According to a further embodiment, the sequence of characteristics of the radar responses may be determined for such heights with respect to the radar sensor only which are smaller than a predefined threshold. In other words, the field of view of the radar sensor which is considered for determining the characteristics may be restricted by the predefined threshold for the height. For example, the predefined threshold may be equal to an initial estimation of the height of the radar sensor over ground, e.g., with respect to the ground plane. By this means, erroneous radar responses may be excluded which do not originate from the ground plane or road surface. Therefore, the accuracy of the method may be improved.

According to another embodiment, the predefined model may be iteratively adapted to the sequence of characteristics of the radar responses. A first iteration may be performed for adapting the predefined model to the sequence of characteristics of the radar responses, and with respect to the result of the first iteration, a region of ranges and heights with respect to the radar sensor may be selected. Thereafter, a further iteration of adapting the predefined model to sequence of characteristics of the radar responses may be performed by considering the characteristics within the selected region of ranges and heights only.

By the iterative adaptation of the predefined model, the accuracy may be enhanced for determining the mounting position. For each iteration, a predetermined field or region of ranges and heights is to be considered for the set of radar responses only, wherein this field or region may have a fixed predetermined size, but may be adjusted for the respective adaptation of the model separately. By this means, the adaptation of the predefined model may be restricted to a region of interest for which the characteristics actually originate from the ground plane or road surface. Conversely, radar responses and their characteristics which originate from moving or stationary targets or objects above the road surface or ground plane may be excluded. Such a restriction of the considered characteristics may also be performed by limiting the instrumental field of view of the radar sensor or by an analog or digital beam forming procedure.

The operations of selecting the region of ranges and heights and of performing a further iteration of adapting the predefined model to the sequence of characteristics may be repeated until a deviation between an actual adaptation and a previous adaptation of the predefined model is below a deviation threshold. Hence, the deviation threshold defines a criterion for terminating the iterations. Moreover, a desired accuracy for the adaptation of the predefined model to the sequence of characteristics and therefore for the determination of the mounting position may be achieved by selecting a suitable deviation threshold.

In another aspect, the present disclosure is directed at a computer system, said computer system being configured to carry out several or all operations of the computer implemented method described herein.

The computer system may comprise a processing unit, at least one memory unit and at least one non-transitory data storage. The non-transitory data storage and/or the memory unit may comprise a computer program for instructing the computer to perform several or all operations or aspects of the computer implemented method described herein.

As used herein, the term processing unit may refer to, be part of, or include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The processing unit may include memory (shared, dedicated, or group) that stores code executed by the processor.

In another aspect, the present disclosure is directed at a vehicle which includes the computer system as described above, and a radar sensor having a mounting position at the vehicle.

In another aspect, the present disclosure is directed at a non-transitory computer readable medium comprising instructions for carrying out several or all operations or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all operations or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

The present disclosure relates to a method for determining a mounting position of a radar sensor at a vehicle.

Figure 1:
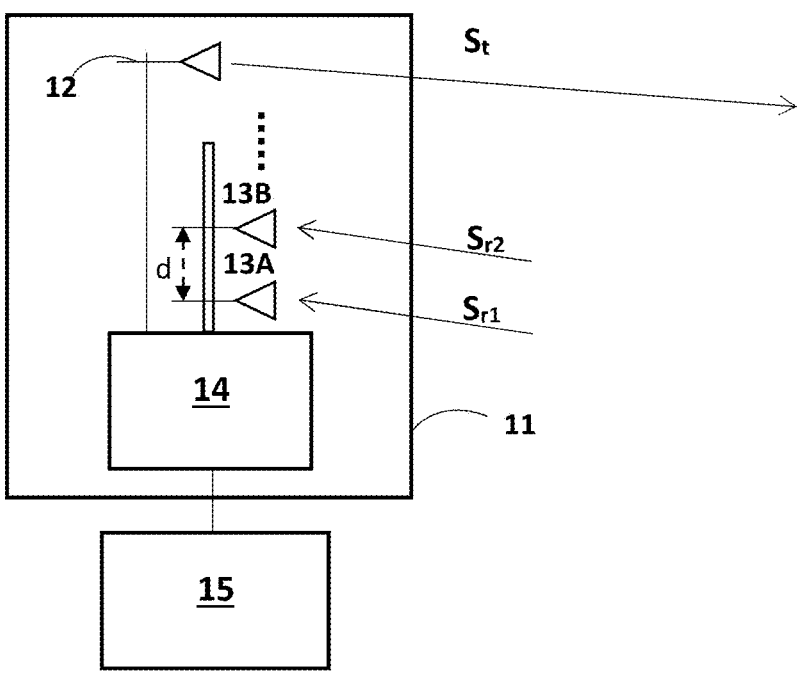
FIG. 1 is an illustration of a radar sensor and a processing unit according to the disclosure.

FIG. 1 schematically depicts a radar sensor 11 which has a transmitting part for transmitting waves $S_t$ and a receiving part for receiving waves $S_{r1}$, $S_{r2}$. The transmitting part includes a transmitter element 12, whereas the receiving part includes a plurality of receiver elements 13A, 13B. Two receiver elements 13A, 13B are represented only, but the receiving part may include more than two receiver elements. The receiver elements 13A, 13B are separated from each other by a given spacing d. The transmitter elements 12 are transmitting antenna elements and the receiver elements 13A, 13B are receiving antenna elements.

The radar sensor 11 further includes a transceiver block 14 to which the transmitter element 12 and the receiver elements 13A, 13B are connected. Via the transceiver block 14, the radar sensor 11 is communicatively connected to a processing unit 15. The transceiver block 14 controls the transmission of waves by the transmitter element 12 and processes the waves received in return by the receiver elements 13A, 13B to extract a measurement information including an amplitude and phase information. The processing unit 15 controls the operation of the radar sensor 11 and performs wave signal processing according to the disclosure. In detail, the processing unit 15 controls the execution of the operations of a method for determining a mounting position of the radar sensor 11 at a vehicle, as described below.

Figure 2:
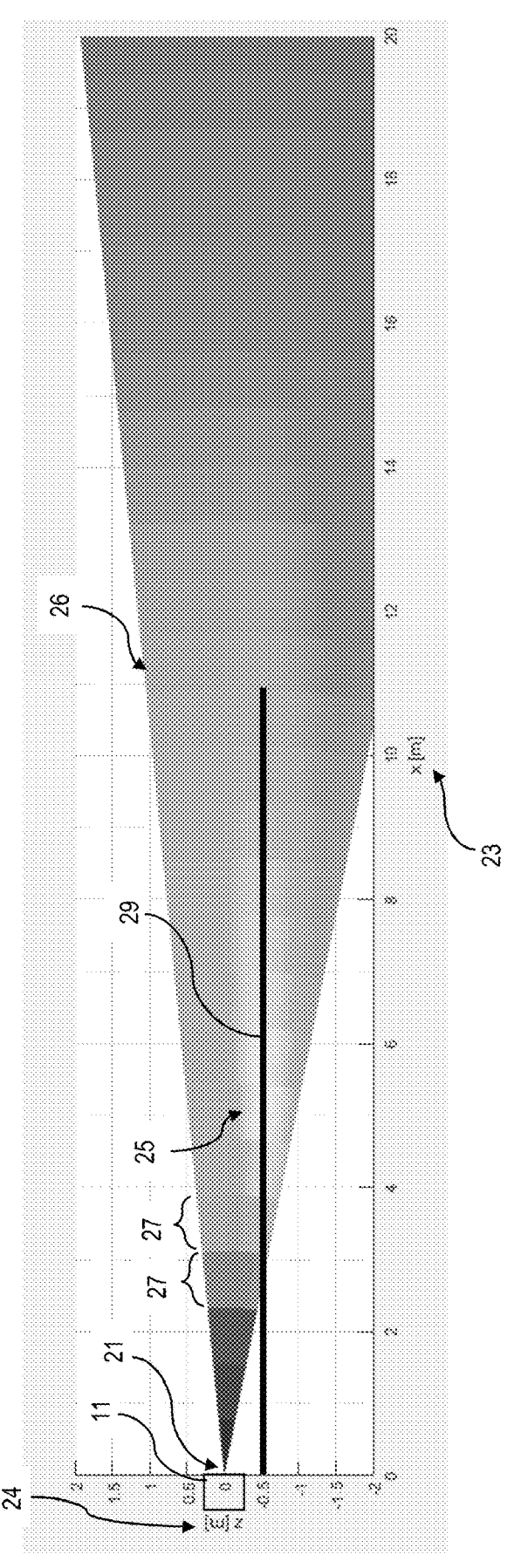
FIG. 2 is an illustration of an elevation spectrum for radar responses from a road surface.

FIG. 2 depicts an elevation or height spectrum for radar responses received by the radar sensor 11 as shown in FIG. 1. In FIG. 2, the radar sensor 11 is depicted schematically at a nominal mounting position or condition 21 which is also the origin of a coordinate system for representing the elevation spectrum. That is, the position 21 represents the nominal mounting position of the radar sensor 11 at a vehicle (not shown).

The coordinate system includes an x-axis 23 representing the driving direction of the vehicle and a z-axis 24 representing a height relative to the radar sensor 11.

The elevation spectrum is depicted as intensity 25 of the radar responses received by the radar sensor 11 within an instrumental field of view 26 of the radar sensor 11. In detail, the intensity 25 is integrated over range intervals or range bins 27.

Moreover, a road surface or ground plane 29 is shown which is assumed to be at a height of z=−0.5 m, e.g., half a meter below the radar sensor 11. Within the elevation spectrum, a dominant radar response or intensity 25 is received from a certain area of the road surface 29, e.g., for a height of approximately −0.5 m.

A peak or maximum finding procedure is applied to the elevation spectrum as shown in FIG. 2 in order to provide a sequence of characteristics 31 depending from height per range bin. For the present example of the radar responses as shown in FIG. 2, the characteristics 31 include peak amplitudes derived from the intensity 25. The result of such a peak finding procedure is shown in FIG. 3 for a plurality of measurements or spectra as shown in FIG. 2.

Figure 3:
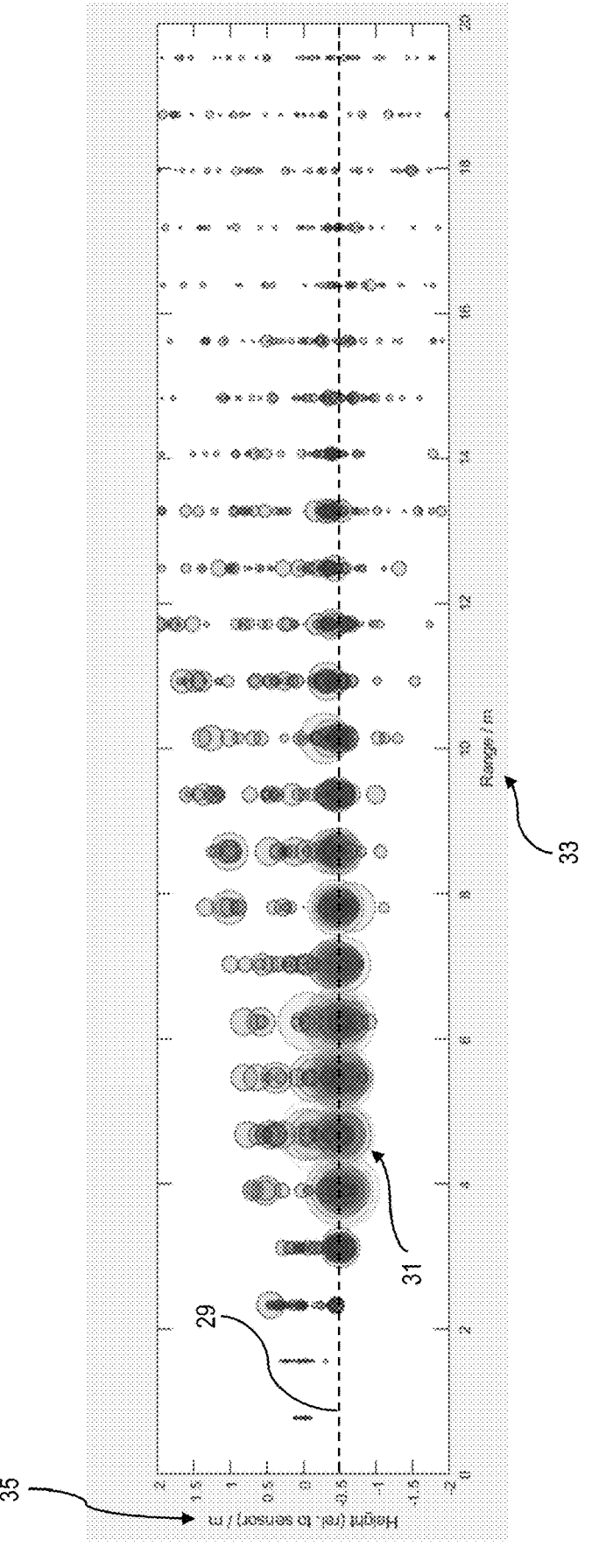
FIG. 3 illustrates amplitudes of radar responses depending from range and height with respect to the radar sensor.

In FIG. 3, the characteristics or peak amplitudes 31 are shown as a function of range 33 in m and height 35 in m with respect to the position of the radar sensor 11 (see FIG. 2). The respective radius of the circles representing the peak amplitude 31 indicates the intensity of the respective peak. As can be seen in FIG. 3, the peak amplitudes 31 are arranged along respective lines at respective fixed ranges. Each line of circles for a fixed range represents a list of peak amplitudes 31 depending from the height for a respective range bin 27 as shown in FIG. 2. That is, each circle along a line in FIG. 3 represents a peak amplitude 31 indicating the accumulated radar response or intensity for the respective range bin 27. The entirety of the lists of peak amplitudes 31, e.g., for all range bins to be considered, is regarded as a sequence of characteristics or peak amplitudes 31 of the radar responses.

As mentioned above, FIG. 3 represents a plurality or accumulation of measurements for which FIG. 2 just represents one example. Such an accumulation of measurements is performed over a predetermined time period and/or over a predetermined motion sequence of the vehicle at which the radar sensor 11 is installed. In the same manner as in FIG. 2, the dashed line 29 represents the ground plane or road surface at a relative height of −0.5 m with respect to the position of the radar sensor 11 (see FIG. 2). As can be recognized in FIG. 3, the peak amplitudes 31 at the height of the road surface or ground plane 29 represent the main contribution for all lists of peak amplitudes 31 for the respective range bins. In principle, the mounting position of the radar sensor 11, e.g., its mounting height above the ground plane 29 and its mounting angle, could be determined based on the data as represented in FIG. 3 by using a linear least-squares fit or estimation, e.g., by fitting a predefined model to the peak amplitudes 31. For the present example, the predefined model includes a linear function having a slope and an offset as parameters in order to adapt the model to the peak amplitudes 31.

However, some of the peak amplitudes 31, e.g., in the upper part of FIG. 3, are located at an incorrect position and would therefore negatively affect the result of such an adaptation of the linear function to the peak amplitudes 31. Therefore, in a first operation the instrumental field of view of the radar sensor 11 is artificially restricted such that peak amplitudes 31 are considered only for which the height is below a predefined threshold, e.g., below z=0 m. The result of such a restriction is shown in FIG. 4 for which peak amplitudes 31 are considered only having a height z≤0 m.

Due to this reduction of the instrumental field of view of the radar sensor 11, some area of the peak finding procedure as shown in FIG. 3 is intentionally not available. This would lead to a biased result when determining the mounting position of the radar sensor 11 if a simple linear least-squares estimation were applied.

In order to avoid effects due to the reduction of the instrumental field of view of the radar sensor 11, e.g., due to the restriction to z≤0 m, on the result of the fitting or adaptation procedure, a linear function is adapted or fitted to the peak amplitudes 31 in an iterative way. The iterative adaptation procedure of the linear function to the peak amplitudes 31 is shown in FIG. 4.

Figure 4:
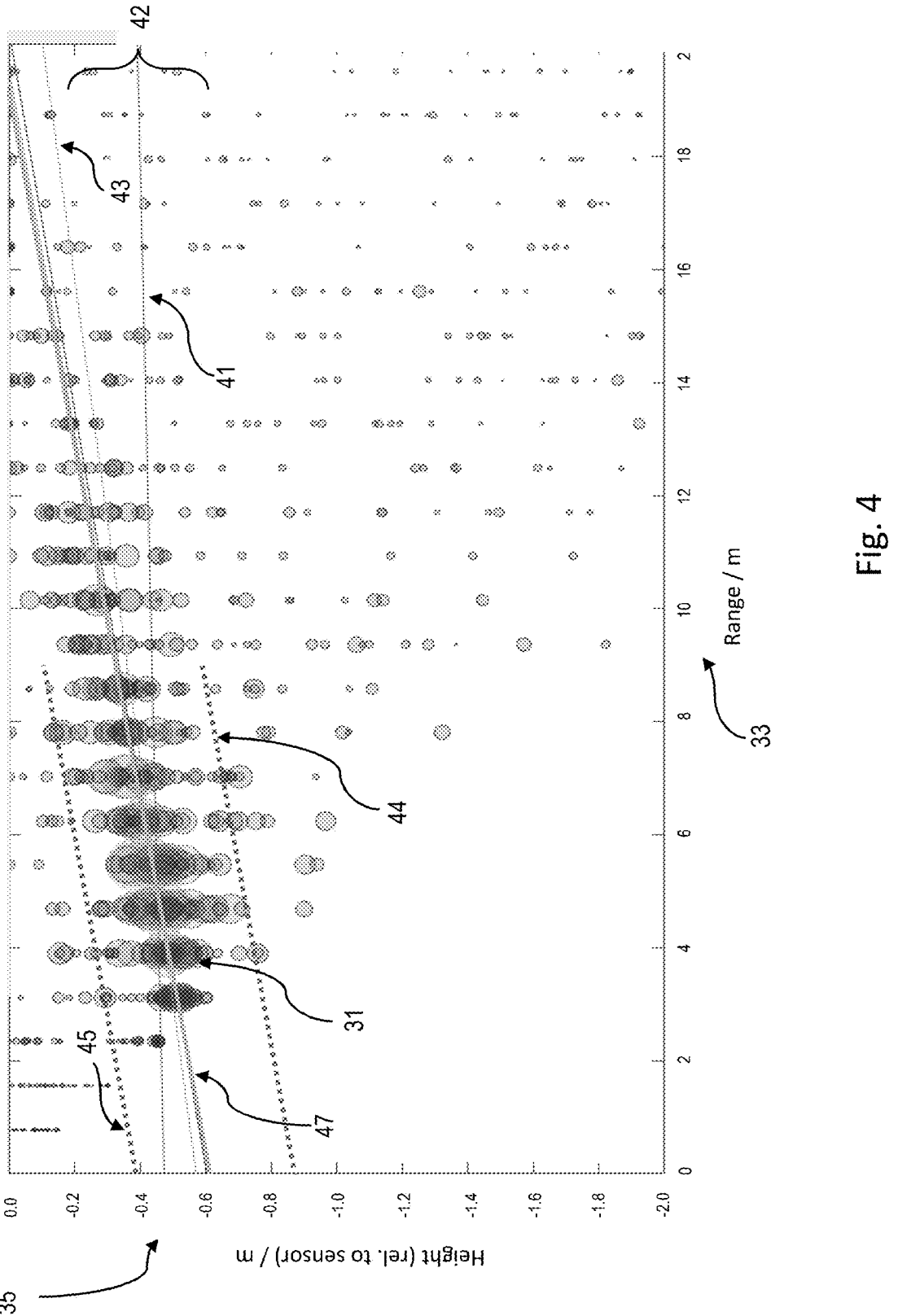
FIG. 4 illustrates an example for an iterative adaption of a linear function to peak amplitudes of the radar responses.

For a first operation or first iteration, all data points or peak amplitudes 31 as shown in FIG. 4 are considered in order to provide a first adaptation 41 of the linear function to the peak amplitudes 31. As explained above, the first adaptation 41 is biased due to the reduced instrumental field of view of the radar sensor 11.

After the first adaptation 41, a region or "tube" 42 of ranges and heights is selected with respect to the result of the first iteration, e.g., with respect to the first adaptation 41 of the linear function to the peak amplitudes 31. This region 42 is arranged symmetrically to the first adaptation 41 such that the same area above and below the line 41 is considered for the peak amplitudes 31.

For the next iteration, peak amplitudes 31 are considered only which have a range 33 and a height 35 within the selected region or "tube" 42. The upper and lower limits of the region 42 can be selected arbitrarily and do not strongly affect the iteration procedure.

The result of the next or second iteration is shown as intermediate adaptation 43 in FIG. 4. For the intermediate adaptation 43, a new region 42 of ranges 33 and heights 35 is selected in order to provide a new "tube" for a next or third adaptation of the linear function to the amplitudes 31.

In FIG. 4, a final or last iteration is shown resulting in a final adaptation 47 of the linear function to the peak amplitudes 31. For the final adaptation 47, a lower limit 44 and an upper limit 45 for the ranges 33 and the heights 35 are shown. That is, for the final adaptation 47 the peak amplitudes 31 are considered only which are located between the lower limit 44 and the upper limit 45.

The offset of the final adaptation 47, e.g., the value at r=0 m, represents the mounting height of the mounting position of the radar sensor 11, whereas the slope of the final adaptation 47 provides the mounting angle of the mounting position of the radar sensor 11. From the final adaptation 47 as shown in FIG. 4, a mounting height of h=−0.6 m and a mounting angle of 1.8° can be derived, wherein this angle is determined from a slope of Δh=0.6 m for Δr=19 m.

The iterations as shown In FIG. 4 are terminated if the deviation between the actual adaptation and the previous adaptation is below a predefined deviation threshold. Hence, a desired accuracy can be requested and achieved for the final adaptation 47. In summary, the mounting height and the mounting angle of the radar sensor 11 can be estimated solely from the radar responses of the road surface, e.g., without the requirement of a factory calibration or the use of targets of opportunity. The mounting position including the mounting height and the mounting angle of the radar sensor 11 can further be corrected with low effort during the life time of the vehicle, e.g., after a repair of the vehicle, and for load changes of the vehicle, e.g., if the number of occupants changes within the vehicle.

Figure 5:
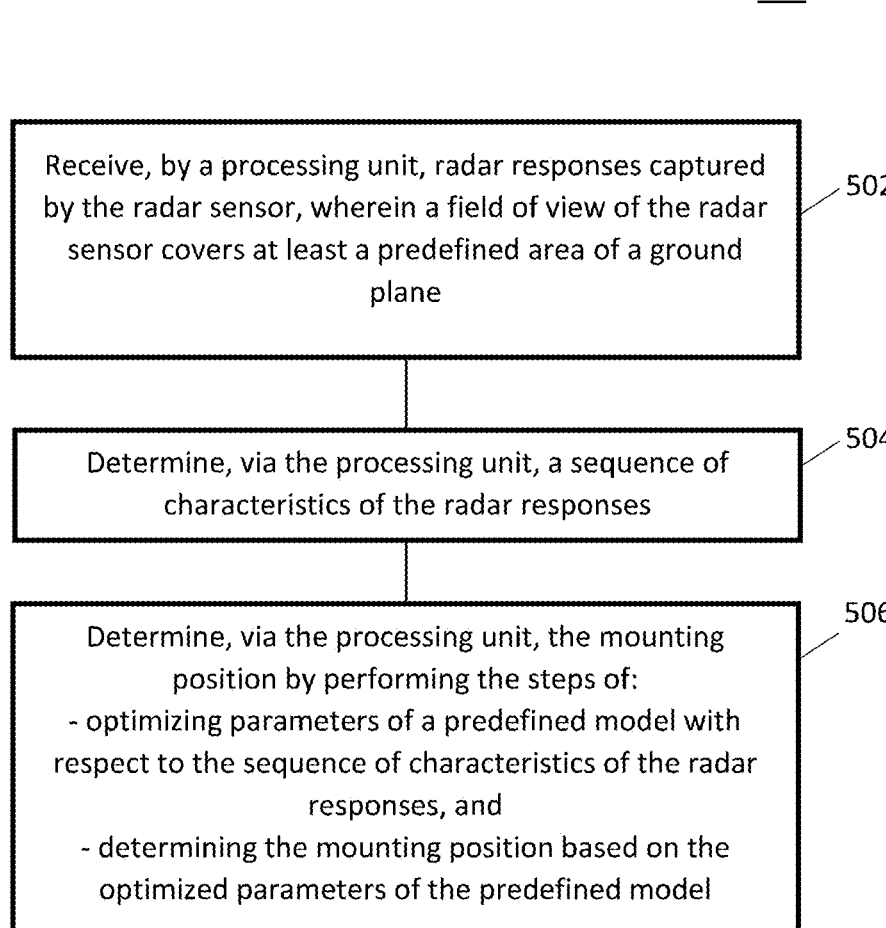
FIG. 5 illustrates a flow diagram illustrating a method for determining a mounting position of a radar sensor at a vehicle according to various embodiments.

FIG. 5 shows a flow diagram 500 illustrating a method for determining a mounting position of a radar sensor at a vehicle according to various embodiments, wherein the mounting position is defined with respect to a ground plane on which the vehicle is currently located.

At 502, radar responses captured by the radar sensor may be received by a processing unit, wherein a field of view of the radar sensor may cover at least a predefined area of the ground plane. At 504, a sequence of characteristics of the radar responses may be determined via the processing unit. At 506, the mounting position may be determined via the processing unit by performing the operations (steps) of: optimizing parameters of a predefined model with respect to the characteristics of the radar responses, and determining the mounting position based on the optimized parameters of the predefined model.

According to various embodiments, the characteristics of the radar responses may depend on a range and on a height with respect to the radar sensor.

According to various embodiments, the predefined model may include a parametric model function representing a height profile of a road on which the vehicle is currently located.

According to various embodiments, the mounting position may include a mounting height and a mounting angle of the radar sensor with respect to the ground plane, the parametric model function may be a linear function, and the mounting height may be determined from an offset of the linear function, whereas the mounting angle may be determined from a slope of the linear function.

According to various embodiments, the sequence of characteristics of the radar responses may be determined depending from coordinates relative to the ground plane and a height with respect to the radar sensor.

According to various embodiments, the mounting position may include a mounting height, a mounting angle and a roll angle of the radar sensor with respect to the ground plane, the predefined model may depend on the coordinates relative to the ground plane and the height with respect to the radar sensor, and the mounting height, the mounting angle and the roll angle may be determined by adapting the predefined model to the sequence of characteristics.

According to various embodiments, the sequence of characteristics of the radar responses may be determined for a predetermined time period.

According to various embodiments, the sequence of characteristics of the radar responses may be determined for a predetermined motion sequence of the vehicle.

According to various embodiments, the sequence of characteristics of the radar responses may be determined for such heights with respect to the radar sensor only which are smaller than a predefined threshold.

According to various embodiments, the predefined model may be iteratively adapted to the sequence of characteristics of the radar responses.

According to various embodiments, a first iteration may be performed for adapting the predefined model to the sequence of characteristics of the radar responses, and with respect to the result of the first iteration, a region of ranges and heights may be selected with respect to the radar sensor, and a further iteration of adapting the predefined model to the sequence of characteristics of the radar responses may be performed by considering the characteristics within the selected region of ranges and heights only.

According to various embodiments, the operations of selecting the region of ranges and heights and of performing a further iteration of adapting the predefined model to the sequence of characteristics may be repeated until a deviation between an actual adaptation and a previous adaptation of the predefined model is below a deviation threshold.

Each of the operations 502, 504, 506, and the further operations described above may be performed by computer hardware components.

Figure 6:
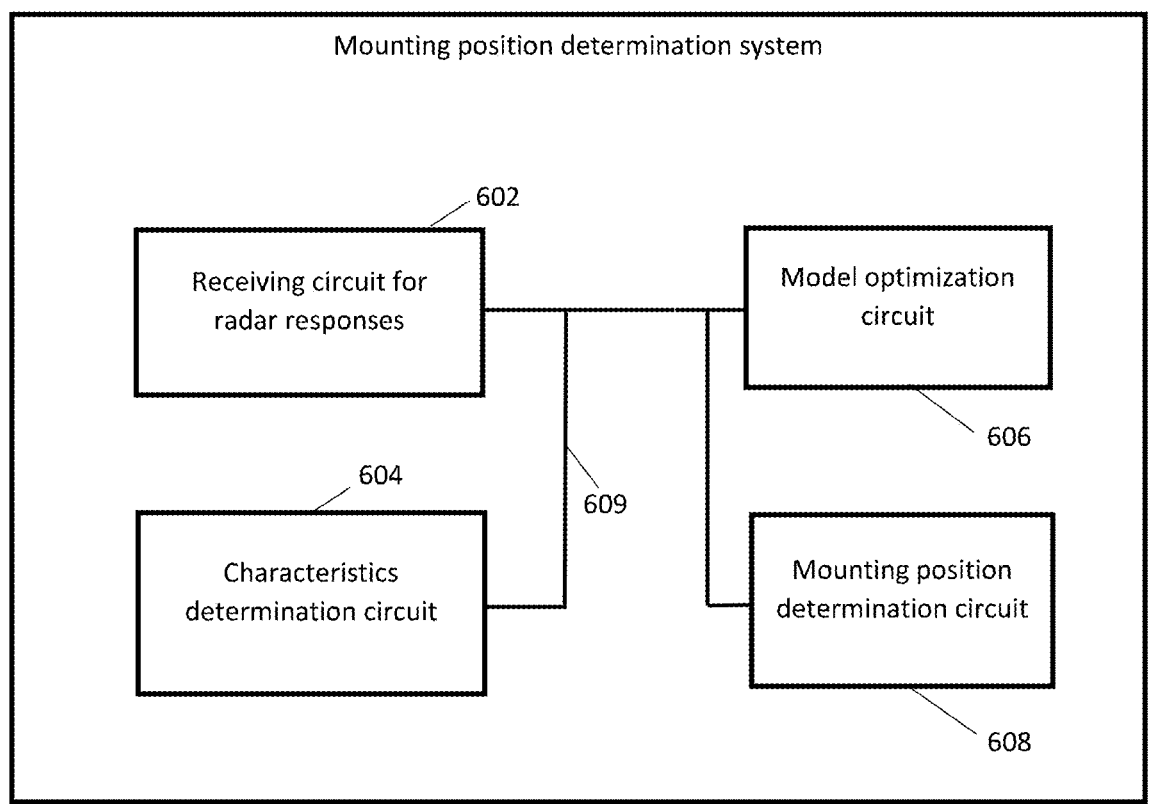
FIG. 6 illustrates a mounting position determination system according to various embodiments.

FIG. 6 shows a mounting position determination system 600 according to various embodiments. The mounting position determination system 600 may include a receiving circuit 602 for radar responses, a characteristics determination circuit 604, a model optimization circuit 606 and a mounting position determination circuit 608.

The receiving circuit 602 may be configured to receive radar responses captured by the radar sensor by a processing unit, wherein a field of view of the radar sensor may cover at least a predefined area of a ground plane.

The characteristics determination circuit 604 may be configured to determine a sequence of characteristics of the radar responses via the processing unit.

The mounting position determination circuit 608 may be configured to determine the mounting position via the processing unit by performing the operations of: optimizing parameters of a predefined model with respect to the characteristics of the radar responses by using the model optimization circuit 606, and determining the mounting position based on the optimized parameters of the predefined model.

The receiving circuit 602 for radar responses circuit, the characteristics determination circuit 604, the model optimization circuit 606 and the mounting position determination circuit 608 may be coupled with each other, e.g., via an electrical connection 609 (e.g., a cable or a computer bus or via any other suitable electrical connection) to exchange electrical signals.

A "circuit" may be understood as any kind of a logic implementing entity, which may be special purpose circuitry or a processor executing a program stored in a memory, firmware, or any combination thereof.

Figure 7:
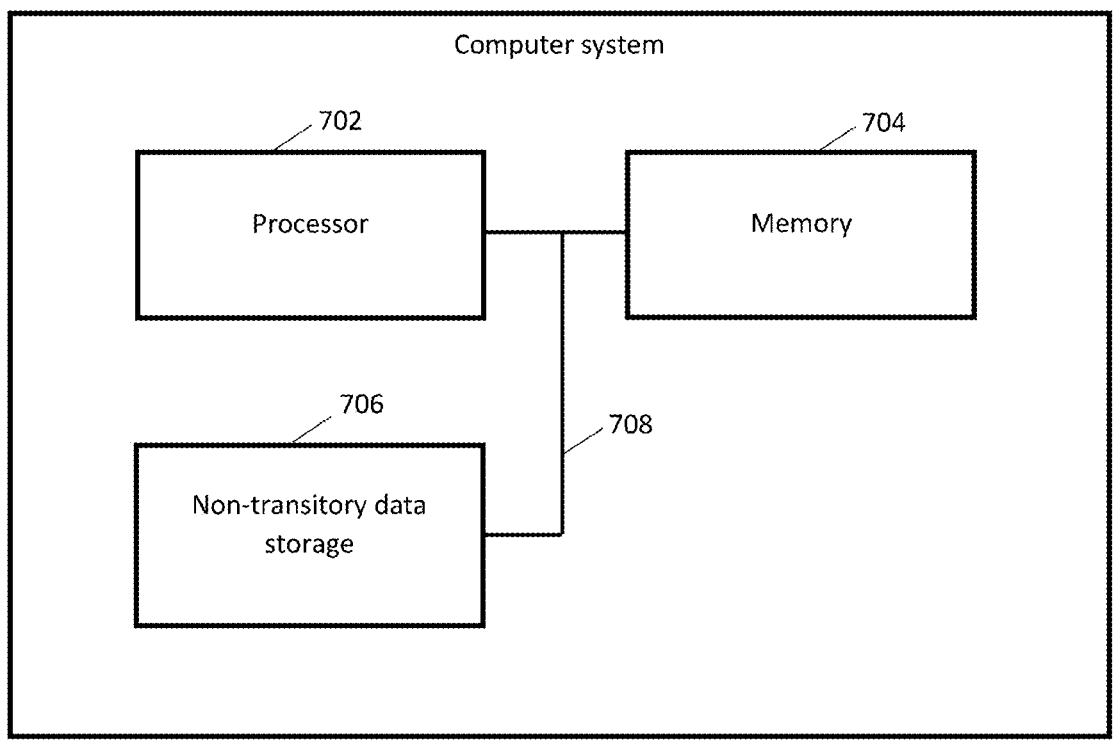
FIG. 7 illustrates a computer system including computer hardware components configured to carry out operations of a computer implemented method for determining a mounting position of a radar sensor at a vehicle according to various embodiments.

FIG. 7 shows a computer system 700 with a plurality of computer hardware components configured to carry out operations of a computer implemented method for determining a mounting position of a radar sensor at a vehicle according to various embodiments. The computer system 700 may include a processor 702, a memory 704, and a non-transitory data storage 706.

The processor 702 may carry out instructions provided in the memory 704. The non-transitory data storage 706 may store a computer program, including the instructions that may be transferred to the memory 704 and then executed by the processor 702.

The processor 702, the memory 704, and the non-transitory data storage 706 may be coupled with each other, e.g., via an electrical connection 708 (e.g., a cable or a computer bus or via any other suitable electrical connection) to exchange electrical signals.

As such, the processor 702, the memory 704 and the non-transitory data storage 706 may represent the receiving circuit 602 for radar responses, the characteristics determination circuit 604, the model optimization circuit 606 and mounting position determination circuit 608, as described above.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the mounting position determination system 600 and/or for the computer system 700.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

List of Reference Characters for the Elements in the Drawings. The following is a list of the certain items in the drawings, in numerical order. Items not listed in the list may nonetheless be part of a given embodiment. For better legibility of the text, a given reference character may be recited near some, but not all, recitations of the referenced item in the text. The same reference number may be used with reference to different examples or different instances of a given item.

11 radar sensor $S_t$ transmitted wave $S_{r1}$, $S_{r2}$ received waves
12 transmitter element
13A, 13B receiver element
14 transceiver block
15 processing unit
21 position of radar sensor
23 x-axis
24 z-axis
25 intensity of radar response
26 instrumental field of view
27 range bin
29 ground plane or road surface
31 amplitude
33 range
35 elevation height
41 first adaptation
42 selected region of ranges and elevation heights
43 intermediate adaptation
44 lower limit of region
45 upper limit of region
47 final adaptation
500 flow diagram illustrating a method for determining a mounting position of a radar sensor at a vehicle
502 operation of receiving radar responses captured by the radar sensor by a processing unit, wherein a field of view of the radar sensor may cover at least a predefined area of a ground plane
504 operation of determining a sequence of characteristics of the radar responses via the processing unit
506 operation of determining the mounting position via the processing unit by performing the operations of: optimizing parameters of a predefined model with respect to the characteristics of the radar responses, and determining the mounting position based on the optimized parameters of the predefined model
600 mounting position determination system
602 receiving circuit for radar responses
604 characteristics determination circuit
606 model optimization circuit
608 mounting position determination circuit
609 connection
700 computer system according to various embodiments
702 processor
704 memory
706 non-transitory data storage
708 connection

What is claimed is:

1. A computer implemented method comprising:
receiving radar responses captured by a radar sensor, a field of view of the radar sensor covering at least a predefined area of a ground plane on which a vehicle is currently located;
determining a sequence of characteristics of the radar responses; and
determining a mounting position of the radar sensor at the vehicle, the mounting position defined with respect to the ground plane, the mounting position determined by:
optimizing parameters of a predefined model with respect to the sequence of characteristics of the radar responses; and
determining the mounting position based on the optimized parameters of the predefined model,
wherein the characteristics of the radar responses depend on a range and on a height with respect to the radar sensor,
wherein the predefined model is iteratively adapted to the sequence of characteristics of the radar responses, wherein a first iteration is performed for adapting the predefined model to the sequence of characteristics of the radar responses,
wherein with respect to a result of the first iteration, a region of ranges and heights is selected with respect to the radar sensor, and
wherein a further iteration of adapting the predefined model to the sequence of characteristics of the radar responses is performed by considering the characteristics within the selected region of ranges and heights only.

2. The method according to claim 1, wherein the predefined model includes a parametric model function representing a height profile of a road on which the vehicle is currently located.

3. The method according to claim 2,
wherein the mounting position includes a mounting height and a mounting angle of the radar sensor with respect to the ground plane,
wherein the parametric model function is a linear function,
wherein the mounting height is determined from an offset of the linear function, and
wherein the mounting angle is determined from a slope of the linear function.

4. The method according to claim 1, wherein the predefined model includes a parametric model function representing a height profile of a road on which the vehicle is currently located.

5. The method according to claim 1, wherein the sequence of characteristics of the radar responses is determined depending from coordinates relative to the ground plane and a height with respect to the radar sensor.

6. The method according to claim 5,
wherein the mounting position includes a mounting height, a mounting angle, and a roll angle of the radar sensor with respect to the ground plane,
wherein the predefined model depends on the coordinates relative to the ground plane and the height with respect to the radar sensor, and
wherein the mounting height, the mounting angle, and the roll angle are determined by adapting the predefined model to the sequence of characteristics.

7. The method according to claim 1, wherein the sequence of characteristics of the radar responses is determined for a predetermined time period.

8. The method according to claim 1, wherein the sequence of characteristics of the radar responses is determined for a predetermined motion sequence of the vehicle.

9. The method according to claim 1, wherein the sequence of characteristics of the radar responses is determined for heights with respect to the radar sensor only which are smaller than a predefined threshold.

10. The method according to claim 1, wherein selecting the region of ranges and heights and performing a further iteration of adapting the predefined model to the sequence of characteristics are repeated until a deviation between an actual adaptation and a previous adaptation of the predefined model is below a deviation threshold.

11. The method according to claim 1,
wherein the predefined model includes a parametric model function representing a height profile of a road on which the vehicle is currently located, and
wherein the sequence of characteristics of the radar responses is determined depending from coordinates relative to the ground plane and a height with respect to the radar sensor.

12. The method according to claim 1, wherein the sequence of characteristics of the radar responses is determined for a predetermined time period, and wherein the predefined model is iteratively adapted to the sequence of characteristics of the radar responses.

13. The method according to claim 1, wherein the predefined model includes a parametric model function representing a height profile of a road on which the vehicle is currently located, and wherein the predefined model is iteratively adapted to the sequence of characteristics of the radar responses.

14. The method according to claim 1, wherein the sequence of characteristics of the radar responses is determined depending from coordinates relative to the ground plane and a height with respect to the radar sensor, and wherein the sequence of characteristics of the radar responses is determined for a predetermined time period.

15. A computer system comprising computer hardware components configured to:

receive radar responses captured by a radar sensor, a field of view of the radar sensor covering at least a predefined area of a ground plane on which a vehicle is currently located;

determine a sequence of characteristics of the radar responses; and determine a mounting position of the radar sensor at the vehicle, the mounting position defined with respect to the ground plane, the mounting position determined by:

optimizing parameters of a predefined model with respect to the sequence of characteristics of the radar responses; and determining the mounting position based on the optimized parameters of the predefined model, wherein the characteristics of the radar responses depend on a range and on a height with respect to the radar sensor, wherein the predefined model is iteratively adapted to the sequence of characteristics of the radar responses, wherein a first iteration is performed for adapting the predefined model to the sequence of characteristics of the radar responses, wherein with respect to a result of the first iteration, a region of ranges and heights is selected with respect to the radar sensor, and wherein a further iteration of adapting the predefined model to the sequence of characteristics of the radar responses is performed by considering the characteristics within the selected region of ranges and heights only.

16. The computer system of claim 15, further comprising:

a vehicle; and the radar sensor having a mounting position at the vehicle.

17. A non-transitory computer readable medium comprising instructions that when executed, configure computer hardware components to:

receive radar responses captured by a radar sensor, a field of view of the radar sensor covering at least a predefined area of a ground plane on which a vehicle is currently located;

determine a sequence of characteristics of the radar responses; and determine a mounting position of the radar sensor at the vehicle, the mounting position defined with respect to the ground plane, the mounting position determined by:

optimizing parameters of a predefined model with respect to the sequence of characteristics of the radar responses; and determining the mounting position based on the optimized parameters of the predefined model, wherein the characteristics of the radar responses depend on a range and on a height with respect to the radar sensor, wherein the predefined model is iteratively adapted to the sequence of characteristics of the radar responses, wherein a first iteration is performed for adapting the predefined model to the sequence of characteristics of the radar responses, wherein with respect to a result of the first iteration, a region of ranges and heights is selected with respect to the radar sensor, and wherein a further iteration of adapting the predefined model to the sequence of characteristics of the radar responses is performed by considering the characteristics within the selected region of ranges and heights only.

* * * * *